United States Patent [19]

Takata

[11] Patent Number: 4,861,114

[45] Date of Patent: Aug. 29, 1989

[54] PROPORTIONING CONTROL VALVE FOR USE WITH ANTILOCK DEVICE

[75] Inventor: Koji Takata, Itami, Japan

[73] Assignee: Sumitomo Electric Industries, Ltd., Osaka, Japan

[21] Appl. No.: 249,933

[22] Filed: Sep. 27, 1988

[30] Foreign Application Priority Data

Sep. 28, 1987 [JP] Japan .................. 62-245292

[51] Int. Cl.$^4$ ............................................ B60T 13/00
[52] U.S. Cl. .......................... 303/9.72; 188/349; 303/9.63; 303/9.71; 303/113
[58] Field of Search ............... 303/9.62, 9.63, 9.64, 303/9.65, 9.66, 9.67, 9.68, 9.69, 9.71, 111, 9.72, 9.73, 9.74, 9.75, 22.1, 22.4, 24.1, 22.5, 113–119, 84.1, 84.2; 188/349, 195

[56] References Cited

U.S. PATENT DOCUMENTS

| | | | |
|---|---|---|---|
| 3,010,282 | 11/1961 | Jansson | 303/9.72 X |
| 3,467,440 | 9/1969 | Strien | 303/9.71 |
| 3,721,473 | 3/1973 | Budzich | 303/9.72 |
| 3,776,603 | 12/1973 | Bueler | 303/9.73 |
| 4,109,967 | 8/1978 | Schopper | 303/9.63 |
| 4,198,099 | 4/1980 | Oberthür | 303/9.63 |
| 4,260,196 | 4/1981 | Takata | 303/9.67 |
| 4,262,968 | 4/1981 | Burgdorf | 303/9.63 |
| 4,265,490 | 5/1981 | Burgdorf | 303/9.63 X |
| 4,289,359 | 9/1981 | Lüpertz et al. | 303/9.71 X |
| 4,316,639 | 2/1982 | Schäfer | 303/9.72 |
| 4,322,114 | 3/1982 | Maehara | 303/9.63 |
| 4,452,494 | 6/1984 | Kadota | 303/9.68 |

Primary Examiner—Douglas C. Butler
Attorney, Agent, or Firm—Wenderoth, Lind & Ponack

[57] ABSTRACT

A proportioning control valve for an antilock control device having a cylinder and first and second pistons mounted therein. The first piston has braking output pressure and first input pressure receiving portions. The second piston slidably mounted on a small-diameter portion of the first piston has a second input pressure receiving portion. A spring is interposed between the two pistons to bias them away from each other. A stopper is provided between the two pistons to limit the movement of the second piston toward the first piston. The cylinder is formed with a control input pressure port communicating with the input pressure receiving portion and an output pressure port communicating with the output pressure receiving portion, and a brake pressure input port. With this arrangement, the output pressure which acts on the output pressure receiving portion of the first piston will counteract the input pressure while the input pressure is below the cutting point and will counteract the sum of the input pressure which acts on the first input pressure receiving portion and the bias of the spring after the input pressure has reached the cutting point. Thus the ratio between the input and output pressures is adjustable by varying the total area of the input pressure receiving portions before reaching the cutting point, and by varying the area of the first input pressure receiving portion and bias of the spring after the cutting point has been reached.

1 Claim, 4 Drawing Sheets

PROPORTIONING CONTROL VALVE FOR USE WITH ANTILOCK DEVICE

The present invention relates to a proportioning control valve for use with an antilock device for a motor vehicle.

In order to assure a safe running, a brake fluid pressure circuit was proposed which has an X-shaped piping arrangement so as to connect each front wheel to the rear wheel at a diagonally opposite side.

With this type of piping arrangement, in order to directly control the brake pressures for the rear wheels, two pairs of pressure adjusting valves have to be provided in each line. This will result in an increase in the production cost.

To avoid such a cost increase, a two-channel control arrangement as shown in FIG. 5 was proposed in which a master cylinder 1 is connected to front wheel brake cylinders 3 and 3' through pressure adjusting valves 2 and 2', respectively. The pressure adjusting valves 2 and 2' are controlled by electronic control devices 5 and 5' adapted to determine whether the wheels are on the way to lock or recovering from lock on the basis of the wheel speed signals from wheel speed sensors 4 and 4'. The electronic control devices 5, 5' may be composed by one computer.

The output pressures of the pressure adjusting valves 2 and 2' are applied to rear wheel brake cylinders 7 and 7' through proportioning pressure-reducing valves 6 and 6' by means of X - piping.

The system shown in FIG. 5 is a simplest type, what is called the two-sensor two-channel system in which no wheel speed sensors are used for the rear wheels. Though its construction is simple, care should be taken not to cause the rear wheels to lock before the front wheels do by the provision of the proportioning pressure-reducing valves 6 and 6' in the rear wheel lines. The valves 6 and 6' may be load-dependent proportioning pressure-reducing valves capable of varying their cutting point according to the load on the vehicle. Thus, as far as the coefficient of friction between the road surface and the wheels at one side is substantially equal to that at the other side (such a coefficient of friction is hereinafter referred to as $\mu$), little problem will be encountered.

But if there is a difference between the $\mu$'s at different sides, the two-channel control system will encounter such a problem that the electronic control devices are unable to detect the lock of the rear wheel at the low-$\mu$ side when it locks before the front wheel in the same line, which is at the other side, i.e. at the high-$\mu$ side, locks. This problem can be prevented to some extent by providing with wheel speed sensors for the rear wheels. But this cannot provide a fundamental solution to all problems with the two-channel control.

In order to control brake pressure satisfactorily with a two-channel antilock system of an X-piping arrangement, it is necessary to keep the braking fluid pressure for the rear wheel at the low-$\mu$ side lower than a value determined on the basis of the braking pressure for the front wheel in the same channel, i.e. at the high-$\mu$ side, in an ordinary condition (where the antilock mode is not in action).

This will be accomplished if the braking pressures for both rear wheels are set to such values as to correspond to the braking pressure for the front wheel at the low-$\mu$side. But with this method, the brake pressure for the rear wheel at the high-$\mu$side may tend to get too low to brake it with a sufficient braking force.

Another method is to determine the braking pressures for the wheels so that the braking pressure for the rear wheel at each side will correspond to that for the front wheel on the same side (in an ordinary condition). But with this method, the automobile may become more liable to swerve to the high-$\mu$side.

As one solution to the abovesaid problems, the present inventor proposed in Japanese Patent Application (filed on Sept. 14, 1987) a system including proportioning control valves in which the braking pressures for the wheels are determined so that the pressure for the rear wheel at the low-$\mu$side will be equal to or slightly greater than a value of pressure which varies in proportion to the pressure for the front wheel at the low-$\mu$side, and the pressure for the rear wheel at the high-$\mu$side will be equal to or slightly less than a value which varies in proportion to the pressure for the front wheel at the high-$\mu$side but will not surpass the pressure for the front wheel at the low-$\mu$side.

However, this type of proportioning control valve is unable to sufficiently lower the pressure for the rear wheel at the low-$\mu$side in correspondence to the pressure for the front wheel at the low-$\mu$side, when the latter is lower than the cutting point of the valve. For example, even if the pressure for the front wheel at the low-$\mu$side is at 0, the pressure for the rear wheel at the low-$\mu$side cannot be lowered below a value corresponding to the bias of the spring in the proportioning control valve as long as the pressure for the front wheel at the high-$\mu$side is kept high.

It is an object of the present invention to provide a proportioning control valve which obviates the abovesaid shortcomings and which is capable of weakening the bias of the spring when the input pressure is below the cutting point of the valve.

In accordance with the present invention, there is provided a proportioning control valve for use in an antilock device for a motor vehicle, comprising a cylinder; a first piston slidably mounted in the cylinder and having a first control input pressure receiving portion and a braking output pressure receiving portion; a second piston slidably mounted in the cylinder on the first piston and having a second control input pressure receiving portion; a spring having one end thereof in abutment with the first piston to bias it in the direction of application of the control input pressure and having the other end thereof in abutment with the second piston; a stopper means for limiting the movement of the second piston toward the first piston, the cylinder being formed with a control input port communicating with the first and second control input pressure receiving portions, a braking pressure output port communicating with the braking output pressure receiving portion, a braking input port; and a passage connecting the braking input port with the braking pressure output port; and a valve means provided in the passage and adapted to open when the first piston moves in the direction of application of the control input pressure and close when the first piston moves in the reverse direction to above.

Each proportioning control valve is provided in the fluid pressure circuit for the rear wheels having an X-piping arrangement in such a manner that its control input port will be connected to the output side of the front wheel pressure adjusting valve in the other channel, its braking pressure input port will be connected to the output side of the pressure adjusting valve in the same channel and its output port to the wheel cylinder for the rear wheel in the same channel. In this arrangement, the pressure which acts on both pressure receiving surfaces of the small-diameter portion of the first piston and the second piston functions to counter the output pressure which acts on the end face of the large-diameter portion of the first piston, before the second piston comes into abutment with the stopper. Upon abutment, the pressure which acts on the small-diameter portion of the first piston and the bias of the spring counters the output pressure.

Thus, the output pressure can be controlled throughout the entire range of the input pressure by suitably adjusting the ratios of the pressure receiving area of the small-diameter portion of the first piston and that of the second piston and the bias of the spring with respect to the pressure receiving area of the large-diameter portion of the first piston.

According to the present invention, the proportioning valve in each line is controlled so that the pressure on the front wheel in the other line and the bias of the spring which varies with the abovesaid front wheel pressure will act as a counterforce to the output pressure for braking the rear wheel. Thus, if there is a difference in the values of μ between the wheels at the righthand side and the lefthand side, the pressures on the rear wheels at the high-μ and low-μside are set to such values as to correspond to the pressures on the front wheels at the high-μ and lowμsides, respectively, even if the pressure on the front wheel at the low-μside is considerably low.

Other features and objects of the present invention will become apparent from the following description taken with reference to the accompanying drawings, in which.

Figure 1:
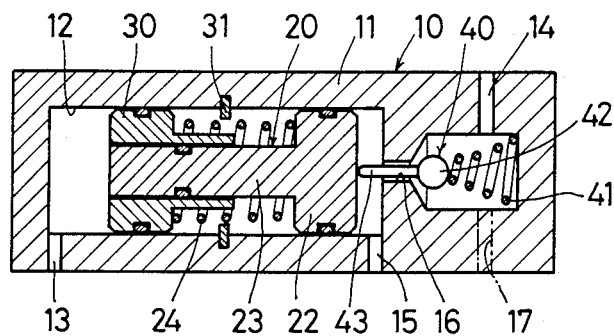
FIG. 1 and 2 are vertical sectional views of embodiments of the proportioning control valve according to the present invention.

Referring first to FIG. 1, a pressure control valve 10 comprises a casing 11 formed with a cylinder chamber 12, and a first piston 20 and a second piston 30 mounted in the cylinder chamber. The piston 20 has a large-diameter portion 22 slidably bearing on the inner wall of the cylinder chamber 12 and a small-diameter portion 23.

The second piston 30 is slidably mounted on the small-diameter portion 23 of the first piston 20. A spring 24 is mounted between the second piston 30 and the large-diameter portion 22 of the first piston 20 so as to bias these pistons 20 and 30 away from each other.

A stopper 31 is provided on the inner wall of the cylinder chamber 12 at its mid-portion so as to restrict the movement of the second piston 30 toward the first piston 20.

The casing 11 is formed with a control input port 13 communicating with the cylinder chamber 12 at one end thereof, a braking pressure output port 15 communicating with the cylinder chamber 12 at the other end thereof, and a braking pressure input port 14 communicating with the other end of the cylinder chamber through a passageway 16.

A valve 40 is provided to open and close the passageway 16. The valve 40 comprises a ball 42, a spring 41 for biasing the ball toward the valve-closing position and a push rod 43. The piston 20 is normally pushed to the righthand side of the drawing so that the push rod 43 is pushed to keep the ball 42 from closing the passageway 16.

The casing may be provided with a short-circuit port 17 for the purpose described later.

Figure 2:
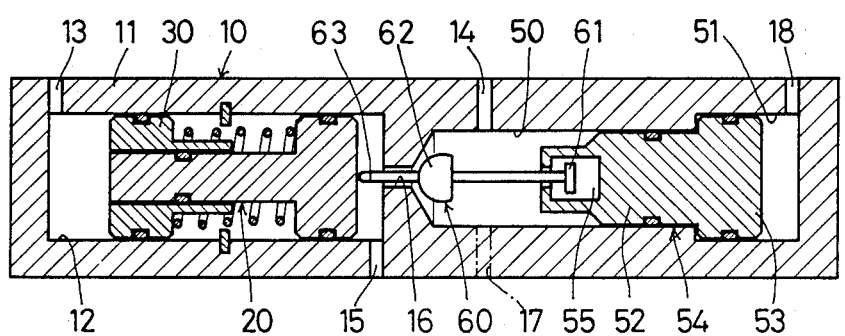

FIG. 2 shows the second embodiment in which further mechanism is added to the control valve 10. A first cylinder chamber 50 and a second cylinder chamber 51 are provided, the former communicating with the passageway 16. A piston 54 comprises a small-diameter portion 52 and a large-diameter portion 53 slidably fitting in the first cylinder chamber 50 and the second cylinder chamber 51, respectively.

The piston 54 has its front end portion hollowed as at 55 to accommodate a flanged end 61 of a rod extending from a valve 60 comprising a semi-spherical valve body 62 and a push rod 63. Numeral 18 designates a failure compensation port.

Figure 3:
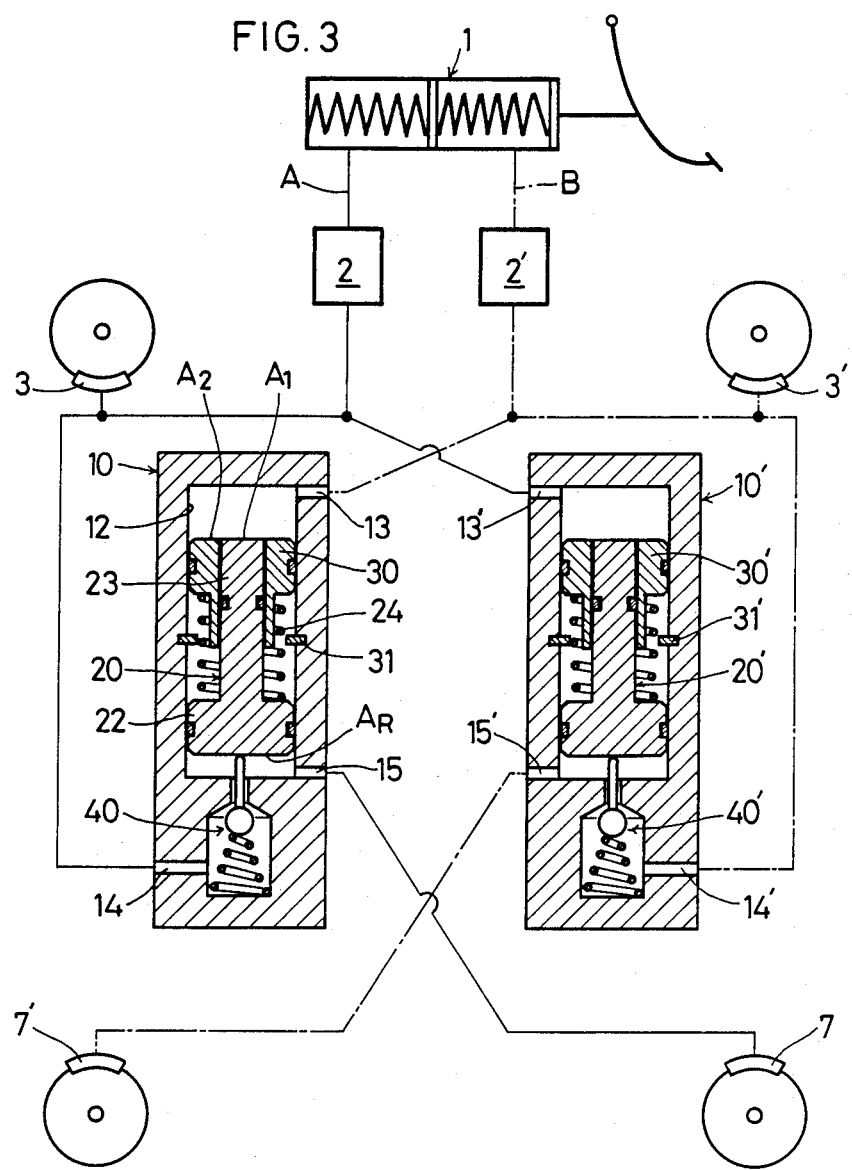
FIG. 3 is a schematic view showing how the proportioning valves are connected.

As shown in FIG. 3, two such control valves 10 of FIG. 2 are used in a two-channel antilock assembly, one for a channel A and one for a channel B (the parts in channel B are represented by dashed numerals). The control valve 10 in channel A is connected to an adjusting valve 2 to be antilock controlled so that its output pressure will be applied to the braking pressure input port 14. The control valve 10' in channel B is connected to an adjusting valve 2' so that its output pressure will be applied to the braking pressure input port 14'.

Further, the output pressures of the adjusting valves 2 and 2' are connected to the control input ports 13' and 13 of the control valves 10', 10, respectively.

Also, the control valves 10 and 10' have their respective output ports 15 and 15' connected diagonally to cylinders 7 and 7' for the rear wheels opposite to the front wheels in the respective channels.

Now, assume that the first piston 20 has an area Ar for receiving the output pressure and an area Al for receiving the control input pressure, and the second piston 30 has an area A2 for receiving the control input pressure, and that the bias of the spring 24 is F when the second piston 30 is in abutment with the stopper 31, the control input pressure is Pf' and the output pressure is Pr, then the following formula will be obtained:

$$Pr = \frac{(A_1 + A_2) P_f'}{A_r} \quad (1)$$

(before the piston 30 comes into abutment with the stopper 31)

$$Pr = \frac{A_1 \cdot P_f' + F}{A_r} \quad (2)$$

(after the piston 30 has abutted the stopper 31) The control input pressure Ps with the piston 30 in abutment with the stopper 31 is expressed as Ps=F/A$_2$.

The on-off control valve 40 in the proportioning control valve 10 serves as a check valve to keep the output pressure for braking the rear wheel the same as or lower than the input pressure in the same line (i.e. the braking pressure for the diagonally opposite front wheel).

With an ordinary proportioning valves, its output pressure is equal to its input pressure until the input pressure reaches the cutting point. According to the present invention, as will be seen from the equation (1), it is possible to adjust the ratio between the output pressure Pr and the control input pressure Pf, that is, the ratio between the braking pressures applied to the rear wheel and the front wheel at the same side to any desired value even before the cutting point is reached by setting the value of $$\frac{A_1 + A_2}{A_r}$$

to a value larger or smaller than 1.0 (this is accomplished by having the cylinder chamber 12 stepped).

As will be apparent from the equation (2), it is also possible to adjust the abovesaid ratio after the input pressure has exceeded the cutting point by changing the values $$\frac{A_1}{A_r} \text{ and } \frac{F}{A_r}.$$

In other words, a free adjustment of the ratio between the output pressure and the input pressure is possible throughout the range of their values.

It is preferable to use the control valves shown in FIG. 2 to provide for the failure of one of the channels.

Figure 4:
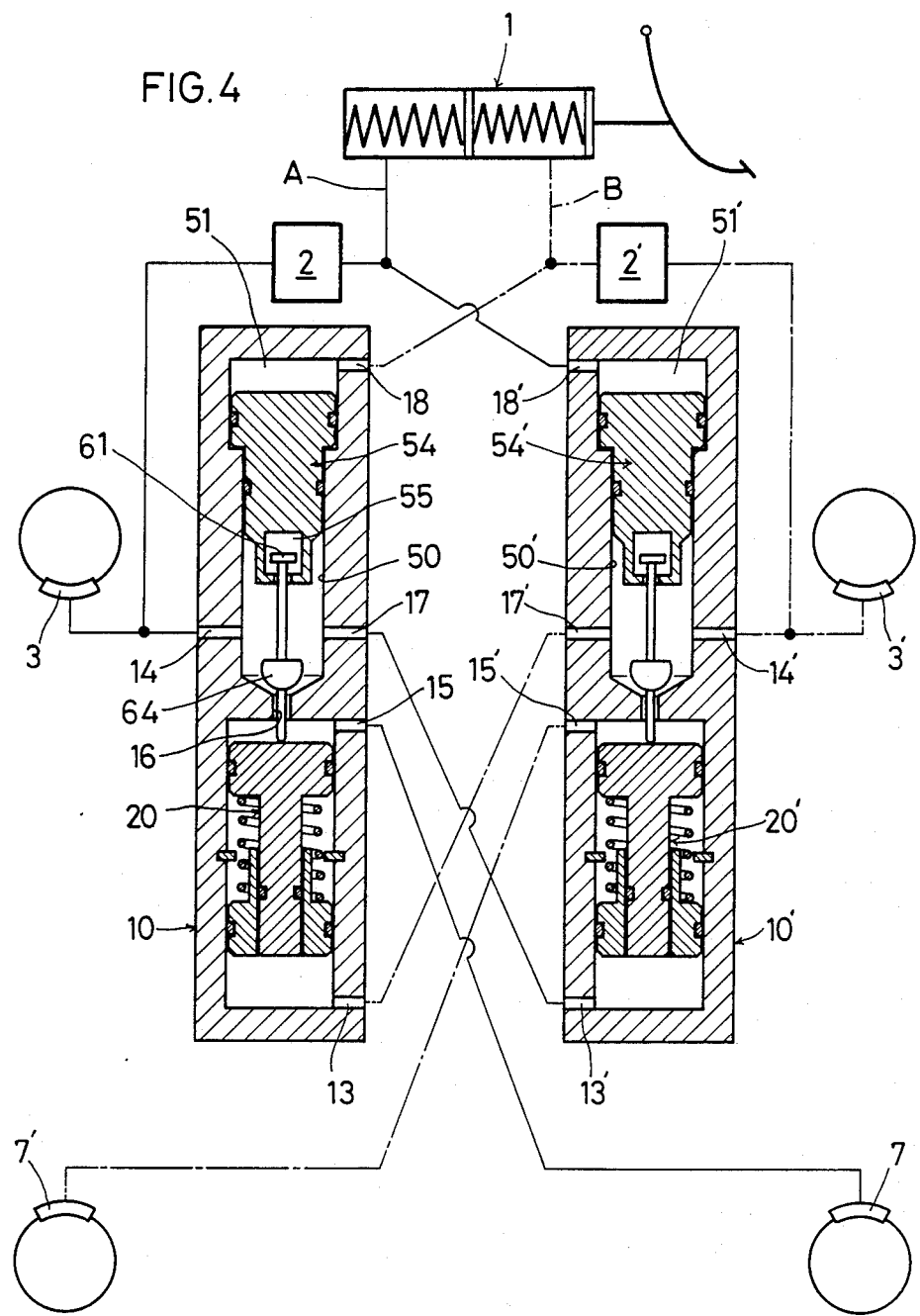
FIG. 4 is a schematic view of the same in another example.
Figure 5:
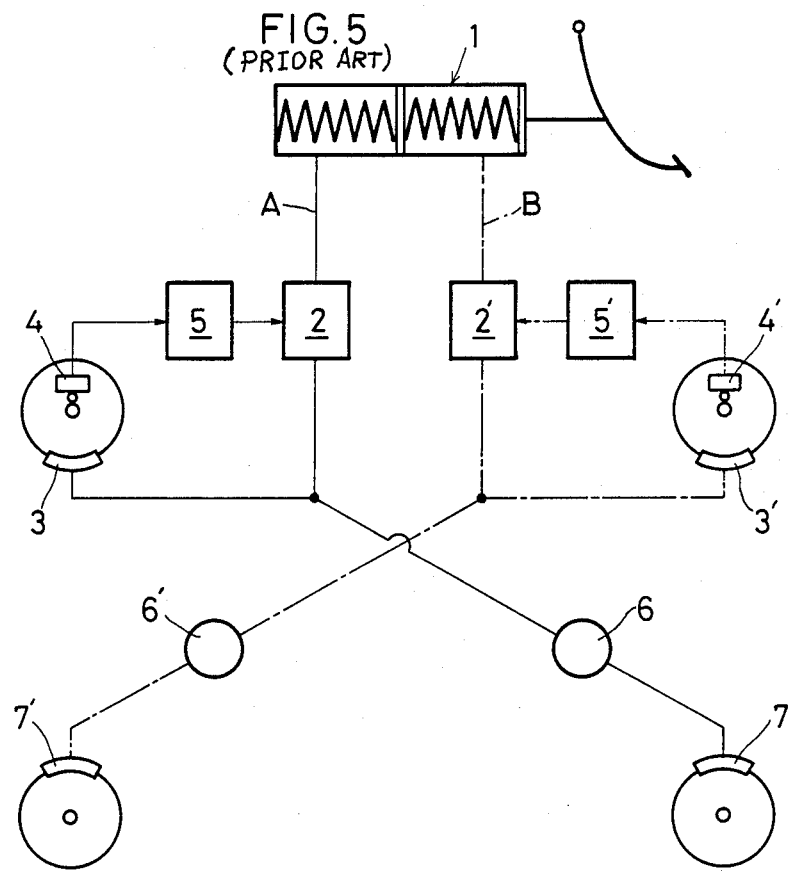
FIG. 5 is a diagramatic view of a prior art two-channel control system.

FIG. 4 shows how such control valves are connected. The output pressure of the master cylinder 1 is directly applied to the ports 18 and 18' and further, through the pressure adjusting valves 2 and 2' to the front wheel cylinders 3 and 3' and to the braking pressure input ports 14 and 14'. The pressures applied to the ports 14 and 14' are further transmitted to the control input ports 13' and 13 in the other lines through the short-circuit ports 17 and 17', respectively.

The output ports 15 and 15' are connected to the rear wheel cylinders 7 and 7', respectively, by means of X-piping.

If the channel B should fail, the chamber 51 will lose pressure, allowing the piston 54 to move upwardly. The valve body 62 will be lifted up together with the piston 54, thus forcibly opening the passage 16. This will allow the fluid pressure from the master cylinder 1 to be applied through the input port 14, the passage 16 and the output port 15 to the rear wheel cylinder 7.

In this state, the chamber 51' is put under the fluid pressure in the channel A, holding the piston 54' at the position shown in FIG. 4, whereas the piston 20 in the channel A is in its lowermost position because no fluid pressure is applied to the port 13 of the control valve 10 in the line A, which is, in the normal condition, put under the fluid pressure applied through the ports 14' and 17'.

By the first pressure application from the master cylinder after the failure has been remedied, the piston 54 will be moved down to the position shown in the figure.

If the channel A should fail, the control valves will operate in the reverse manner to the foregoing.

Other measures may also be taken to cope with the failure of one of the lines. For example, bypass valves may be provided.

Wheel speed sensors may be mounted only for the front wheels or for all the wheels.

What is claimed is:

1. A proportioning control valve for use in an antilock device for a motor vehicle, comprising a cylinder; a first piston slidably mounted in said cylinder and having a first control input pressure receiving portion and a braking output pressure receiving portion; a second piston slidably mounted in said cylinder on said first piston and having a second control input pressure receiving portion; a spring having one end thereof in abutment with said first piston to bias it in the direction of application of the control input pressure and having the other end thereof in abutment with said second piston; a stopper means for limiting the movement of said second piston toward said first piston, said cylinder being formed with a control input port communicating with said first and second control input pressure receiving portions, a braking pressure output port communicating with said braking output pressure receiving portion, a braking input port; and a passage connecting said braking input port with said braking pressure output port; and a valve means provided in said passage and adapted to open when said first piston moves in the direction of application of the control input pressure and close when said first piston moves in the reverse direction to above.

* * * * *